United States Patent
Stoehr

(10) Patent No.: US 6,477,256 B1
(45) Date of Patent: Nov. 5, 2002

(54) METHOD AND DEVICE FOR LOCAL LINKING OF OPTICAL AND ACOUSTIC SIGNALS

(75) Inventor: Herwig Stoehr, Berlin (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 08/744,912

(22) Filed: Nov. 8, 1996

(30) Foreign Application Priority Data

Nov. 11, 1995 (DE) .......................................... 195 42 147

(51) Int. Cl.[7] ................................................. H04R 5/02
(52) U.S. Cl. ......................... 381/306; 381/191; 381/333
(58) Field of Search .......................... 381/90, 191, 306, 381/333, 388, 152; 348/14.01, 14.07, 14.09, 14.11, 14.08, 14.12

(56) References Cited

U.S. PATENT DOCUMENTS

| | | | | |
|---|---|---|---|---|
| 4,352,039 A | * | 9/1982 | Hagood et al. | ............. 381/191 |
| 4,965,819 A | * | 10/1990 | Kannes | ......................... 379/53 |
| 4,998,283 A | * | 3/1991 | Nishida et al. | ............... 381/90 |
| 5,291,556 A | * | 3/1994 | Gale | ........................... 381/24 |
| 5,309,519 A | * | 5/1994 | Park et al. | |
| 5,400,414 A | * | 3/1995 | Thiele | ........................ 381/24 |

FOREIGN PATENT DOCUMENTS

| | | | |
|---|---|---|---|
| DE | 846 558 | 7/1949 | |
| DE | 3832616 | 3/1990 | |
| DE | 3832617.5 | 3/1990 | |
| DE | 4115221 | * 12/1992 | ................. 381/191 |
| DE | 4420212 | 12/1995 | |
| EP | 0 323 110 | 7/1989 | |
| JP | 02-31288 | 2/1990 | |
| WO | WO 90/03711 | 4/1990 | |
| WO | WO 95/26102 | 9/1995 | |

OTHER PUBLICATIONS

Patent Abst. of Japan, 6–62349, Jun. 13, 1994, vol. 18, No. 308, "Television Receiver".

Patent Abst. of Japan, 4–222180, Dec. 10, 1992, vol. 16, No. 570, "Loudspeaker System for Television Receiver".

Patent Abst. of Japan, 60–58783, Aug. 6, 1985, vol. 9, No. 189, "Display Device".

* cited by examiner

*Primary Examiner*—Xu Mei
(74) *Attorney, Agent, or Firm*—Kenyon & Kenyon

(57) ABSTRACT

A process for locally linking optical and acoustic signals in an audiovisual apparatus and an arrangement comprising a plurality of electro-acoustic transducers are described. There are known audiovisual apparatuses capable of multichannel sound reproduction, wherein, however, no satisfactory local linkage takes place between optical and acoustic signals. Thus a plurality of electro-acoustic transducers are provided. They are electrically controlled independently of each other, and are arranged in the immediate proximity of an image reproduction device. The different image areas then can be associated with the sound signals, emitted by the respective transducers, and originating from the corresponding locations.

14 Claims, 2 Drawing Sheets

METHOD AND DEVICE FOR LOCAL LINKING OF OPTICAL AND ACOUSTIC SIGNALS

FIELD OF THE INVENTION

The present invention concerns a method and device for locally linking optical and acoustic signals in an audiovisual apparatus.

RELATED TECHNOLOGY

Speech and sound reproduction in audiovisual apparatuses such as TV sets and monitors is currently performed through conventional dynamic speakers located outside the image area, mostly beside or below the screen apparatus. In speakers thus arranged, there is very little or no local linkage between the optical information displayed on the screen and the sound signals emitted by the speakers. Multichannel sound reproduction techniques, such as the "Dolby Surround Process," capable of bombarding the viewer from a plurality of directions on the horizontal plane, have been developed in the past, however, even this technique lacks direct local correspondence between the audio signals and the respective video signals. In other words, a viewer cannot receive the image and the corresponding sound signal from the same point on the screen.

Instead of placing the speaker outside the plane of the screen, German Offenlegungsschrift 3,832.616 discloses an electro-acoustic transducer with a piezopolymeric transparent film applied to the TV screen itself. Thus a correspondence between the spatial location of the screen and the transducer is achieved; however, the aforementioned arrangement is incapable of producing local linkage between a plurality of optical events on the screen and the corresponding sound signals as is desirable, for example, in videoconferences with a plurality of conference participants.

SUMMARY OF THE INVENTION

Therefore, the object of the invention is to provide a process and an arrangement comprising a plurality of electro-acoustic transducers to make improved linkage between optical and acoustic signals possible in an audiovisual apparatus with an image and sound reproduction device. Another object of the invention is to improve an electrostatic audio transducer so that it can be used in a transducer arrangement. A further object of the invention is to provide a device for local linkage between optical and acoustic signals encompassing a display and at least one electrostatic transducer integrated therein.

The present invention therefore provides a method for locally linking optical (video) and acoustic (audio) signals in an audiovisual apparatus with an image and sound reproduction device, wherein a plurality of electro-acoustic transducers are arranged in the immediate proximity of the image reproduction device. The transducers are electrically controlled independently of one another so that the optical events taking place in different image areas of the image reproduction device can be associated with the sound signals corresponding to the same locations, emitted by the respective electro-acoustic transducers.

The present invention also provides an arrangement comprising a plurality of electro-acoustic transducers, which can be used for locally linking optical and acoustic signals in an audiovisual apparatus with an image reproduction device. The electro-acoustic transducers are arranged in the immediate proximity of the image reproduction device and can be electrically controlled independently of one another so that the optical events taking place in different image areas of the image reproduction device can be associated with the sound signals originating at the corresponding locations and emitted by the respective transducers.

An electrostatic sound transducer for use in the arrangement is also provided. The sound transducer comprises an electrically conductive, transparent membrane, in particular, a plastic film, and a counter-electrode arranged at a predefined distance from the membrane.

The present invention also provides a device for local linkage between optical and acoustic signals with a display for representing the optical signals and at least one electrostatic transducer which has: an electrically conductive, transparent counter-electrode applied to the outer display layer; an insulating, transparent intermediate layer with a predefined elasticity so that it can experience small variations in thickness, applied to the conductive. transparent counter-electrode; and an electrically conductive, transparent membrane applied to the intermediate layer.

Further advantageous embodiments provide that a plurality of transparent transducers, which can be electrically controlled independently of one another, are arranged on the face of the image reproduction device in the form of a matrix. The transparent electro-acoustic transducers may be electrostatic and/or piezoelectric transducers, and may be integrated into the surface of the image reproduction device.

The electro-acoustic transducers also may be arranged alongside the image reproduction device and may be dynamic transducers. The transparent sound emitting elements, each one acoustically connected to one of the electro-acoustic transducers, may be arranged on the face of the image reproduction device.

The electro-acoustic transducers can be arranged behind the image reproduction device in the case of frontal projection of optical events onto the image reproduction device.

The transducers may also have an electrically conductive, transparent membrane, in particular, a plastic film, and a counter-electrode may be arranged at a predefined distance from the membrane. The counter-electrode may be a transparent metal grid, an electrically conductive glass or a metallized transparent plastic film. The electrically conductive glass may have a surface structured so that with the transparent membrane applied to said surface a plurality of small sound emitting elements are formed.

The surface of the image reproduction device may be electrically conductive and form the counter-electrode of the electrostatic transducer.

The present invention thus provides local linkage between video and sound signals in an audiovisual apparatus by having a plurality of electro-acoustic transducers arranged in the immediate proximity of the image reproduction device and electrically controlled independently of one another so that the optical events taking place in the different areas of the image reproduction device can be associated with the corresponding sound signals, emitted by the electro-acoustic transducers and originating from the respective locations. Thus a perceived coincidence of the video and sound signals for all image points can be achieved, since the electro-acoustic transducers emit the sound signals from the screen location where the corresponding visual information is produced.

Optimal linkage between optical and acoustic signals is obtained when a plurality of transparent transducers, electrically controlled independently of one another, are arranged in the form of a matrix on the face of the image reproduction device. Piezo-electric and/or electrostatic transducers can be used, for example, as transparent transducers.

Direct local image-sound linkage can be advantageously implemented by integrating the electrostatic transducers on the surface of the image reproduction device itself. In this case, the surface of the image reproduction device is made electrically conductive and serves as a counter-electrode for the transducer, which also has a transparent, electrically conductive membrane for emitting sound energy.

One important field of application for the present invention is videoconferencing. Efforts have been made for some time to develop ever larger screens capable of displaying the conference participants at actual size. The invention offers a considerable advantage here in that observing conference participants can always perceive the speech signal coming from the location on their screen where the conference participant speaking at the time is represented. Thanks to the transducer arrangement of the invention, speech comprehension in a videoconference can be improved and the quality of communication in general can be enhanced.

BRIEF DESCRIPTION OF THE DRAWINGS

The invention is explained below using the following drawings.

DETAILED DESCRIPTION

Figure 1:
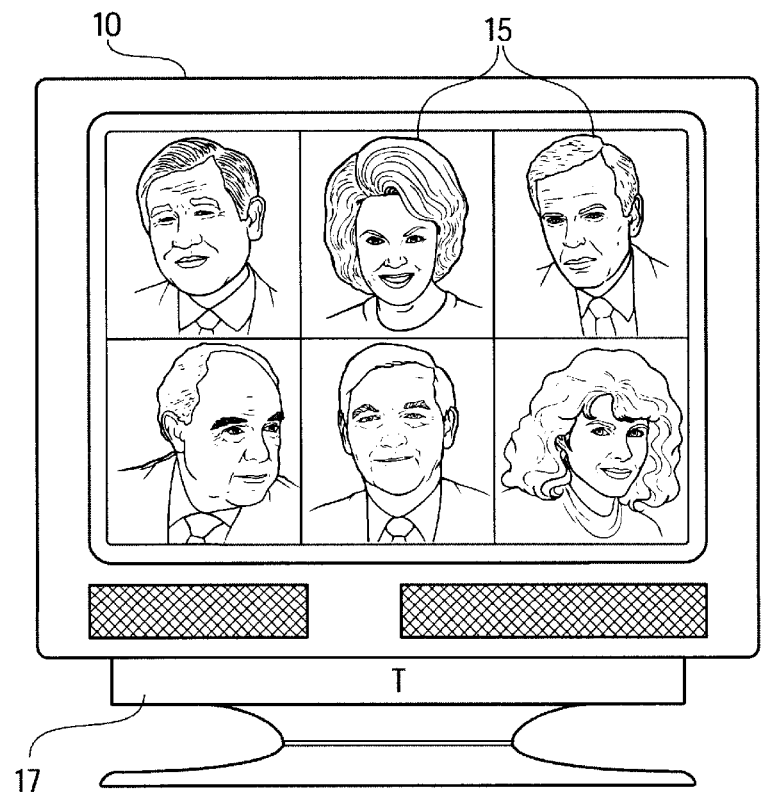
FIG. 1 shows a possible arrangement of transparent transducers on the face of a TV screen.
Figure 2:
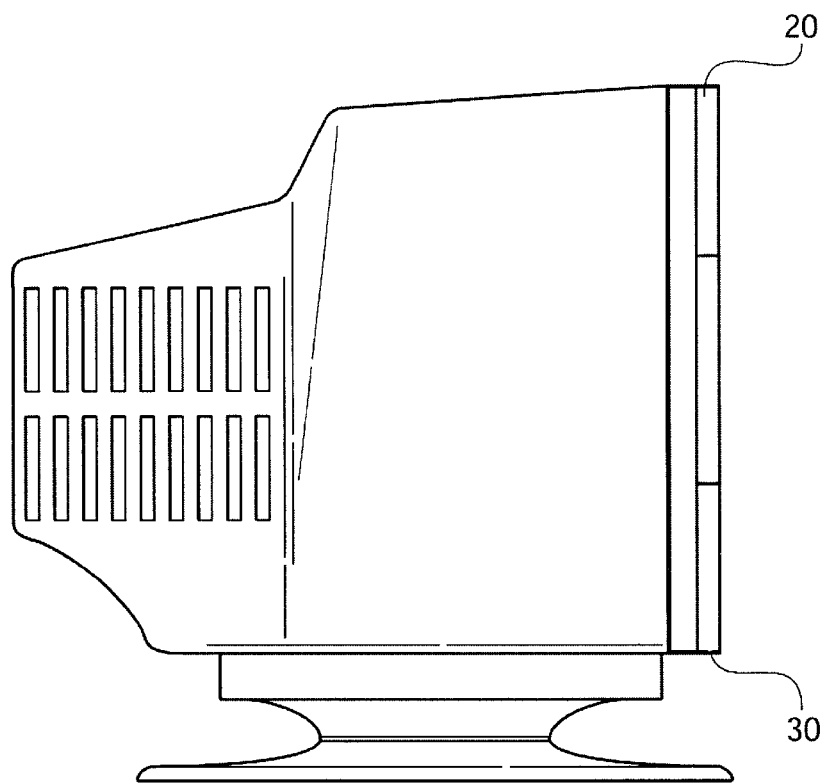
FIG. 2 shows a side view of the TV set of FIG. 1.

FIG. 1 shows an audiovisual apparatus 10, such as a TV set, divided into six image areas or windows 15. Let us assume that a multipoint videoconference between seven conference participants is taking place, and that a TV set according to FIG. 1 is set up next to each conference participant. It should be pointed out that the invention can also be used in conventional videoconferencing where there are two groups of people in two locations. Each conference participant sees the six other conference participants in one window 15 each of his or her TV set 10. As FIG. 2 shows, matrix 30 comprising six transparent electrostatic electroacoustic transducers 20 can be arranged on the face of the screen of TV set 10, so that the observing conference participants can not only see who is talking to whom, but can also correctly locate the speaking participants acoustically. Thus, one transducer 20 is directly assigned to each window 15. The six transducer elements 20 can be conveniently controlled electrically independently of one another, so that the speech signals of the speaking conference participant are only emitted from transducer 20 that is directly located in front of window 15 where the speaking participant is represented at the moment. If the video signals of the six separate image areas 15 are linked with the acoustic signals from the respective locations, TV set 10 (transducer matrix 30) should be able to apply each of the six sound transmission channels to the corresponding transducer 20. A low-frequency speaker 17, emitting the low-frequency components of the sound signal to be reproduced of all (e.g., six) channels, can be provided below the screen of TV set 10. This seems to be practical, since the directional perception of low frequencies by human hearing is poor, and the (electrostatic or piezoelectric-type) transducers on the face of the screen can only emit low-frequency sounds of a limited intensity. Therefore the higher frequencies are transmitted through transparent transducers 20.

Figure 3:
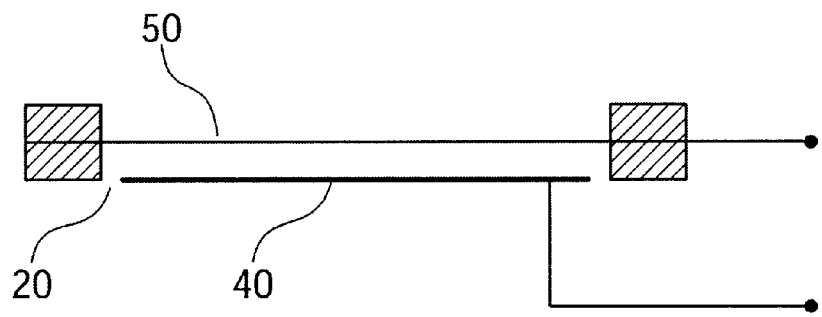
FIG. 3 shows the schematic diagram of an electrostatic transducer that can be used in the arrangement according to the invention.
Figure 4:
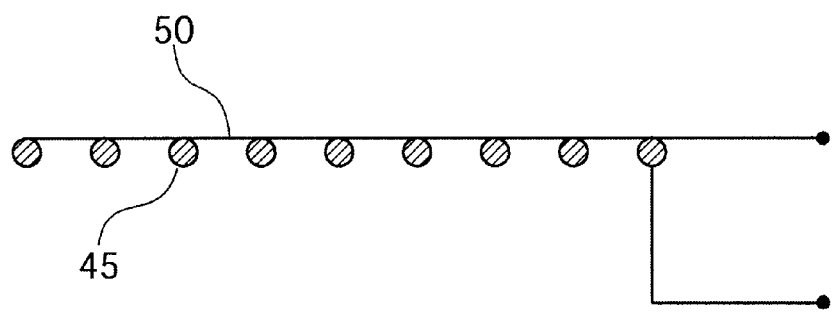
FIG. 4 shows a simplified schematic diagram of an electrostatic transducer comprising a plurality of small sound emitters.

FIG. 3 shows an embodiment of an electrostatic transducer 20, as can be used in transducer matrix 30. Electrostatic transducer 20 has a transparent counter-electrode 40 and a thin, transparent, and electrically conductive membrane 50. Membrane 50 can be, for example, a plastic film metal-coated on one side or made electrically conductive by some other process. The signal voltage to be converted into sound energy and a polarization voltage are applied to membrane 50 and counter-electrode 40. The polarization voltage is a DC voltage and is used to linearize the transmission curve of transducer 20, in order to avoid signal distortions. Electrically conductive glass, metal-coated plastic films, or highly transparent metal grids (meshes) can be used as counter-electrode 40. With the help of such a transparent metal grid, represented in FIG. 4, the efficiency of electrostatic transducer 20 can be increased and its frequency response can be linearized. This effect results from the fact that a plurality of small cavities, i.e., a plurality of small sound transducers, are formed between membrane 50 and the grid-shaped counter-electrode 45. The small sound transducers thus formed, measuring about 0.5 to 5 mm, are always capable of vibrating at their fundamental frequencies. A similar effect is achieved if a transparent, undulated and electrically conductive surface, acting as a counter-electrode for transducer 20, is applied to the screen surface of TV set 10.

Membrane 50 is then applied to the surface which has been made rough, for example, by providing it with nubs. Also in this case, a plurality of small transducers are obtained, which contribute to improving the efficiency of transducer 20. As mentioned before, the transparent electrostatic transducer 20, represented in FIGS. 3 and 4, can be one of the six transducer elements of matrix 30.

In addition to the above-described separate arrangement of transparent transducers on the face of the screen for image-sound linkage, it is also perfectly possible to integrate transparent transducers into the screen.

For this purpose, the TV surface itself is used as a counter-electrode by making it electrically conductive, for example, by metallizing. An electrically conductive plastic film must then also be placed as a membrane at a suitable distance from the video tubes. The DC voltage required for biasing the transducer integrated with the screen surface can be obtained, for example, from the high-voltage source normally available in monitors with conventional Braun tubes.

Figure 5:
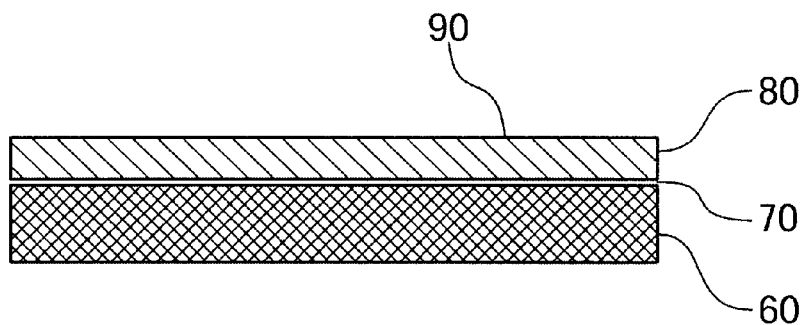
FIG. 5 shows the cross-section of an electrostatic transducer integrated in a display.

An electro-acoustic transducer can also be integrated into advanced LC, TFT, or other displays, to achieve efficient and direct local linkage between optical and acoustic signals. An electrostatic transducer integrated in a display is illustrated in FIG. 5. The transducer has an outer display layer 60, to which a conductive transparent layer is applied as a counter-electrode 70. To ensure a suitable distance between counter-electrode 70 and a membrane 90, an insulating, transparent intermediate layer 80 with a predefined elasticity is applied between them. Intermediate layer 80 may then experience small variations in thickness on the order of about 0.1 mm.

so that the overlying electrically conductive, transparent membrane 90 can move. In addition to transparent electrostatic transducers 20, transparent piezoelectric transducers can also be used in matrix 30 arranged on the face of the TV set screen.

A simpler alternative for local image-sound linkage, requiring no transparent electro-acoustic transducers. comprises arranging a plurality of electro-acoustic transducers alongside, above and/or under TV set 10. With six transducers suitably arranged around the screen, a sufficient coincidence of optical and acoustic signals can still be achieved, for example, in the videoconference illustrated in FIG. 1. It should be mentioned that all transducers can be electrically controlled independently from one another. Regular electrodynamic transducers can be used as electro-acoustic transducers. To improve the local linkage between optical and acoustic signals, transparent emitting elements, each one acoustically connected to a transducer located outside the screen, can also be provided directly on the face of the screen. The sound energy produced by the transducers is transmitted to the emitting element either as airborne sound or as structure-borne sound. A channel configured to be capable of transmitting the desired frequency range is required for airborne sound transmission. Flat cavities with outlet openings or elements with transparent films can be used, for example, for the emission of the transmitted sound energy. For structure-borne sound transmission, rigid waveguides are required between each transducer and each emitting element. Structure-borne sound is converted to airborne sound, i.e., the sound energy is emitted by rigid, transparent surfaces such as films or glass.

Another alternative for linking the optical signals with acoustic signals originating from the same location comprises providing non-transparent electro-acoustic transducers behind a projection screen. This transducer arrangement is, however, only possible in the case of frontal projections, such as movie or video projection.

The present invention makes it possible to achieve a perceived coincidence of image and sound signals for all points on the screen. For this purpose, a multiplicity of electro-acoustic transducers is used, each emitting its sound signal from the point on the screen which also supplies the actual corresponding visual information. The best local linkage between optical and acoustic information is obtained when a transparent transducer system is arranged directly on the face of the screen. The image-sound system is also multichannel-capable, i.e., each transducer emits only those sound signals that belong to the screen window directly assigned to the transducer. In the case of quasi-static video information, as is the case of videoconferencing, such a sound reproduction method is especially advantageous.

What is claimed is:

1. A method for locally linikng optical and acoustic signals in an audiovisual apparatus comprising the steps of;
    arranging a plurality of electro-acoustic transducers including at least a first transducer and a second transducer in the immediate proximity of an image reproduction device of the audiovisual apparatus, the image reproduction device having at least a first image area and a second image area; and
    producing sound signals from the first transducer which emanate sound directly from the first image area and sound signals from the second transducer which emante sound directly from the second image area depending on optical events taking place in the first and second image areas.

2. An audio arrangement comprising:
    a plurality of electro-acoustic transducers including at least a first transducer and a second transducer for locally linking optical and acoustic signals in an audiovisual apparatus having an image reproduction device having at least a first image area and a second image area;
    the electro-acoustic transducers being arranged in the immediate proximity of the image reproduction device and electrically controllable independently of one another, sound signals emitted by the first transducer emanating sound directly from the first image area and sound signals emitted by the second transducer emanating sound directly from the second image area as a function of optical events taking place in the first image area and the second image area.

3. The audio arrangement as recited in claim 2, wherein the plurality of electro-acoustic transducers are transparent and are arranged on a surface of the image reproduction device in the form of a matrix.

4. The audio arrangement as recited in claim 3 wherein the transparent electro-acoustic transducers are electrostatic or piezoelectric transducers.

5. The audio arrangement as recited in claim 3 wherein the electro-acoustic transducers are integrated into the surface of the image reproduction device.

6. The audio arrangement as recited in claim 2 wherein the electro-acoustic transducers are arranged alongside the image reproduction device and are dynamic transducers.

7. The audio arrangement as recited in claim 6 further comprising transparent sound emitting elements, each one acoustically connected to one of the electro-acoustic transducers, arranged on a surface of the image reproduction device.

8. The audio arrangement as recited in claim 2 wherein the electro-acoustic transducers are arranged behind the image reproduction device when the optical events are frontally projected onto the image reproduction device.

9. The audio arrangement as recited in claim 3 wherein at least one electro-acoustic transducer comprises an electrically conductive, transparent membrane and a counter-electrode arranged at a predefined distance from the membrane.

10. The audio arrangement as recited in claim 9 wherein the transparent membrane is a plastic film.

11. The audio arrangement as recited in claim 9 wherein the counter-electrode is a transparent metal grid, an electrically conductive glass or a metallized transparent plastic film.

12. The audio arrangemnent as recited in claim 11 wherein the counter-electrode is an electrically conductive glass having a surface structured so that a plurality of small sound emitting elements are formed with the transparent membrane.

13. The audio arrangement as recited in claim 9 wherein the surface of the image reproduction device is electrically conductive and forms the counter-electrode of the electro-acoustic transducer.

14. A device for locally linking optical and acoustic signals comprising a display for the optical signals, and at least one electrostatic transducer including:
    an electrically conductive, transparent counter-electrode applied to an outer display layer,
    an insulating, transparent intermediate layer with a predefined elasticity so that the intermediate layer can experience small variations in thickness, the intermediate layer being next to the conductive, transparent counter-electrode, and
    an electrically conductive, transparent membrane next to the intermediate layer.

* * * * *